J. NEFF, Jr.
SIDE-HILL PLOW.
No. 172,928.  Patented Feb. 1, 1876.
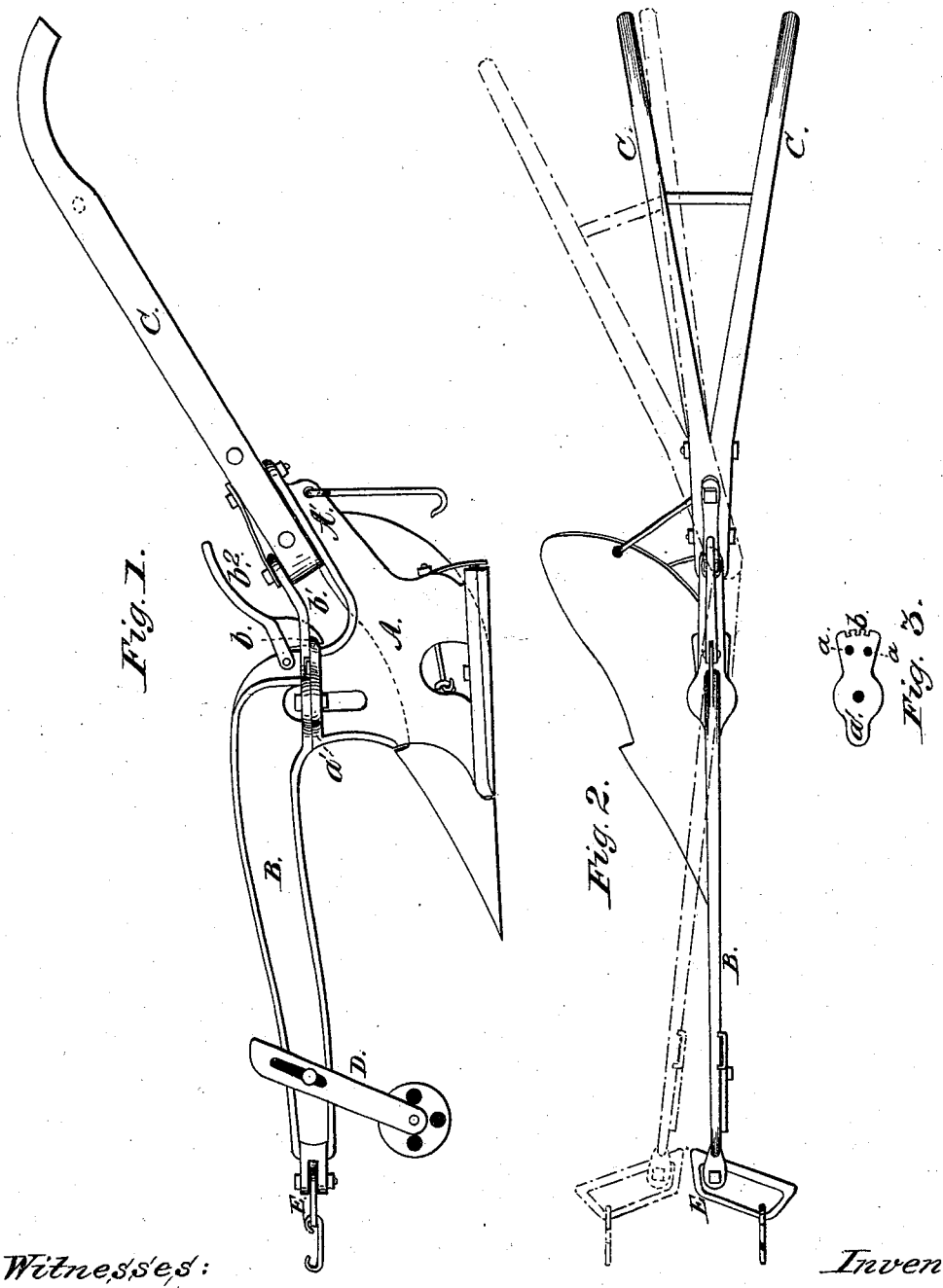

UNITED STATES PATENT OFFICE.

JOHN NEFF, JR., OF PULTNEY, NEW YORK.

IMPROVEMENT IN SIDE-HILL PLOWS.

Specification forming part of Letters Patent No. 172,928, dated February 1, 1876; application filed July 16, 1875.

*To all whom it may concern:*

Be it known that I, JOHN NEFF, Jr., of Pultney, in the county of Steuben and State of New York, have invented an Improvement in Side-Hill Plows, of which the following is a specification:

The object of my invention is to make a plow that may be adapted to the various uses to which a plow may be applied on the farm, in the garden, orchard, or vineyard, by combining with the ordinary side-hill plow the adjustable beam, handles, and means for securing them where adjusted; also, a shifting clevis at the forward end of the beam, all arranged so that the plow may be made to turn a furrow to or from fruit-trees or grape-trellis, and turn the furrow either way or all one way, either on the side hill or level ground. When the beam is turned to plow close to trees or vines, the handles will also be adjusted away from the trees or vine-trellis, and the clevis shifted so as to avoid doing injury to the trees or vines, and avoid injury to or by the handles of the plow or hands of the operator, as clearly shown in the accompanying drawings, in which—

Figure 1 is a side view; Fig. 2, a top view, and Fig. 3 the top of the plate on the vertex of the standard.

A is the standard. It is made similar to the standards of other side-hill plows, except at the vertex, where the beam is united to it, and at the rear end, where the handles are applied. The vertex is made in the form represented in Fig. 3, with a hole to bolt the beam to it; and in rear of the bolt-hole are two stops, to prevent the beam being turned too far, and at the rear end a series of notches, *b*, for the catch at the rear end of the beam to enter to hold the beam in the required position. The rear end extends backward obliquely at any angle that will give the required position to the handles. It has a hole for a bolt that holds the handles to it, and on this bolt the handles turn.

B is the beam. It is made of cast iron. The rear end, at the under edge, is made to fit upon the top of the standard, with a hole for a bolt to hold it to the standard, and a part that goes between the stops *a;* and it is provided with a levered catch, $b^2$, that works in the notches in the rear end of the standard-plate, as shown in Fig. 1, also a part, $b^1$, extending to the upper side of the handles, with a bolt-hole in the end for a bolt to hold the handles to it, so that when the handles are turned the beam will be turned, also. The forward end is made to receive the clevis E, or may be made so that a separate fastening may be applied to it for the clevis.

C are the handles. They are made of wood, and placed upon the rear end of the standard, and are held by a bolt that will allow them to be turned to the right or left. At the forward end a bolt passes through them and the rear end of the beam, so that the operator may, by disengaging the catch, turn the handles to the right or left, and at the same time turn the beam, also.

D is the wheel for regulating the depth of furrow. It is held in position with any ordinary support.

E is the clevis by which the plow is drawn. It may be made of cast or wrought iron, and of any size or strength required. Its shape is represented in Fig. 3. It is held in the forward end of the beam with a bolt, so that it may slide freely either way, and change its position when the beam is changed. It should be made to slide freely, so that in turning around or changing the beam it will be turned by the team. The draft-hook must be made to slide freely on its forward part.

What I claim as new, and desire to secure by Letters Patent, is—

1. The standard A, having at the top the horizontal beam-plate $a'$, provided with stops or projections *a a*, and having the oblique rear extension A', as described and shown.

2. The plow-beam B, pivoted horizontally upon the standard-plate, and having the rear extension $b^1$ and the lever-catch $b^2$, substantially as and for the purpose set forth.

3. The handles C, pivoted obliquely upon the rear extension A' of the standard, and pivoted lower down to the rear extension $b^1$ of the beam, whereby the direction of the plow-beam may be changed by the handles and locked in position by the lever-catch, as shown and described.

4. The combination of the standard A, beam B, handles C, and lever-catch $b^2$, all constructed and arranged substantially as shown and described.

JOHN NEFF, JR.

Witnesses:
JOHN L. LEWIS,
CHARLES KETCHUM.